United States Patent
Morita et al.

(10) Patent No.: US 9,139,442 B2
(45) Date of Patent: Sep. 22, 2015

(54) METHOD FOR PRODUCING CHLOROPOLYSILANE AND FLUIDIZED-BED REACTOR

(75) Inventors: Masatoshi Morita, Nagoya (JP); Tatsuya Kanie, Tokai (JP); Hiromu Taguchi, Nagoya (JP); Kanemasa Takashima, Tokai (JP)

(73) Assignee: TOAGOSEI CO. LTD., Tokyo (JP)

( * ) Notice: Subject to any disclaimer, the term of this patent is extended or adjusted under 35 U.S.C. 154(b) by 0 days.

(21) Appl. No.: 14/350,834

(22) PCT Filed: Jul. 26, 2012

(86) PCT No.: PCT/JP2012/068946
§ 371 (c)(1),
(2), (4) Date: Apr. 10, 2014

(87) PCT Pub. No.: WO2013/057997
PCT Pub. Date: Apr. 25, 2013

(65) Prior Publication Data
US 2014/0234197 A1    Aug. 21, 2014

(30) Foreign Application Priority Data
Oct. 18, 2011   (JP) ................... 2011-228756

(51) Int. Cl.
*C01B 33/107* (2006.01)
*B01J 8/24* (2006.01)
(Continued)

(52) U.S. Cl.
CPC .............. *C01B 33/107* (2013.01); *B01J 8/006* (2013.01); *B01J 8/16* (2013.01); *B01J 2208/00212* (2013.01); *B01J 2208/00274* (2013.01)

(58) Field of Classification Search
CPC ........... C01B 33/107; B01J 8/16; B01J 8/006; B01J 8/24; B01J 8/40; B01J 2208/00212; B01J 2208/00274
See application file for complete search history.

(56) References Cited

U.S. PATENT DOCUMENTS

2006/0227312 A1    10/2006  Owa et al.
2009/0047204 A1*    2/2009  Kim et al. ............. 423/349
(Continued)

FOREIGN PATENT DOCUMENTS

CN          101863848 A     10/2010
DE    10 2009 037155 B3    11/2010
(Continued)

OTHER PUBLICATIONS

International Search Report issued in International Application No. PCT/JP2012/068946 on Oct. 30, 2012 (with translation).
(Continued)

*Primary Examiner* — Colleen Dunn
(74) *Attorney, Agent, or Firm* — Oliff PLC (57) ABSTRACT

Disclosed is a method for producing chloropolysilane by which the yield of a fluid reaction to produce the chloropolysilane is improved while blockage in a reactor caused by attachment of higher-order silicon chloride as a by-product is prevented. In producing the chloropolysilane by reacting fluidized silicon particles or silicon alloy particles with a chlorine gas, an outlet filter is provided, upstream from a product outlet that releases a reaction product, above the area in which the silicon particles or silicon alloy particles are fluidized inside a reaction tank. The outlet filter prevents fine particles blown up by fluidization from flowing out of the reaction tank through the product outlet. A temperature of the outlet filter is set in a range of 210 to 350° C.

12 Claims, 6 Drawing Sheets

(51) Int. Cl.
  *B01J 8/40* (2006.01)
  *B01J 8/16* (2006.01)
  *B01J 8/00* (2006.01)

(56) References Cited

U.S. PATENT DOCUMENTS

| | | | |
|---|---|---|---|
| 2010/0068116 A1* | 3/2010 | Kim et al. | 423/349 |
| 2010/0129281 A1 | 5/2010 | Bakke et al. | |
| 2010/0290970 A1 | 11/2010 | Staffin et al. | |
| 2012/0189526 A1 | 7/2012 | Petrik et al. | |

FOREIGN PATENT DOCUMENTS

| | | |
|---|---|---|
| EP | 0 348 902 A2 | 1/1990 |
| JP | A-63-233007 | 9/1988 |
| JP | A-2010-10703 | 1/2010 |
| JP | A-2010-18508 | 1/2010 |
| JP | A-2010-500274 | 1/2010 |
| JP | A-2010-526013 | 7/2010 |

OTHER PUBLICATIONS

Jun. 9, 2015 Office Action issued in Japanese Application No. 2013-539559.

Jun. 1, 2015 Office Action issued in Chinese Application No. 201280051270.4.

Jul. 10, 2015 European Search Report issued in European Application No. 12841660.9.

* cited by examiner

METHOD FOR PRODUCING CHLOROPOLYSILANE AND FLUIDIZED-BED REACTOR

TECHNICAL FIELD

The present invention relates to a method for producing chloropolysilane, and a fluidized-bed reactor, and in particular, relates to a method for producing chloropolysilane, which is preferably used for a material for a semiconductor device, and a fluidized-bed reactor that is suitably used in producing chloropolysilane.

BACKGROUND ART

Conventionally, a silicon monomer such as $SiH_4$ (monosilane), $SiHCl_3$ (trichlorosilane), and $SiCl_4$ (tetrachlorosilane) as a raw material for a silicon wafer, and a production method thereof have been known; however, in recent years, with the development of electronic technology, higher-order silane such as $Si_2H_6$ (disilane) receives attention as a material with which a chemical vapor deposition method (CVD method) for forming a film such as an amorphous silicon film or a silicon oxide film on a substrate is performed at a low temperature at a high speed, and thus chloropolysilane such as $Si_2Cl_6$ grows in demand as a material for the higher-order silane, so that an efficient production method thereof is desired.

For example, Patent Document 1 discloses a method for producing $SiCl_4$ (tetrachlorosilane) by reacting $Cl_2$ with Si obtained from a residue of high purity silicon with the use of a gas-phase fluidized-bed reactor. Patent Document 1 describes providing in the reactor a dust collector for collecting Si particles to be transported to the outside of the reactor, but does not describes that higher-order chloride such as chloropolysilane could be generated by the reaction between Si and $Cl_2$. Thus, without assuming generation of a product other than $SiCl_4$, Patent Document 1 does not refer to possible problems such as condensation or precipitation of a high-boiling higher-order chloride and blockage in the reactor with the chloride at all. Patent Document 1 does not refer to measures against the problems, either.

Patent Document 2 discloses that chloropolysilane is efficiently obtained with the use of copper catalyst or a copper compound catalyst in a reaction of Si with $Cl_2$; however, disclosed is only a producing method using a fixed-bed reactor. Thus, Patent Document 2 does not refer to problems that could arise in a fluidized-bed reactor such as how to trap powders to be conveyed to the outside of the reactor or how to prevent blockage in the reactor with a high-boiling higher-order chloride.

Patent Document 3 discloses a method for producing $SiHCl_3$ (trichlorosilane) by the reaction of metallic silicon powders with HCl gas. A gas phase fluidized-bed reactor is used for the reaction. In the reactor, the metallic silicon powders react with the HCl gas supplied from the bottom of the reactor while fluidize by the gas. $SiHCl_3$ is produced by the reaction. Patent Document 3 also describes separating coarse particles from a reaction fluid containing $SiHCl_3$ discharged from the reactor and returning the coarse particles into the reactor, while filtering out fine particles in the reaction fluid.

One of the significant differences of Patent Document 3 from Patent Documents 1 and 2 is that the HCl gas is used for the reaction in Patent Document 3. Since $SiHCl_3$ is generated stoichiometrically in the reaction, there is no possibility that high-boiling higher-order chloride generated causes a blockage in the reactor; however, unreacted coarse silicon particles and fine particles of chlorides as impurities are both generated in the reaction. Patent Document 3 describes that these particles are separately trapped with the combined use of a separating means for a coarse particle such as a cyclone, and a filter. The unreacted silicon particles trapped are recycled as a reacting material.

CITATION LIST

Patent Literature

Patent Document 1: JP 2010-526013 T
Patent Document 2: JP Sho63-233007 A
Patent Document 3: JP 2010-10703 A

SUMMARY OF INVENTION

Technical Problem

The present applicant proposed using a vibration-type reactor for producing chloropolysilane such as $Si_2Cl_6$ by reacting Si with $Cl_2$. However, in the case of using the vibration-type reactor, a part of unreacted silicon particles are blown up to flow out of a product outlet that collects a reaction product during chlorination reaction of the silicon particles, and thereby the reaction yield is reduced. Even if the silicon particles are prevented from flowing out, for example, with the use of a filter, there could arise a new problem that blockage is caused in the filter by higher-order silicon chloride attached to the filter.

An object of the present invention is to provide a method for producing chloropolysilane by which the yield of a fluid reaction to produce the chloropolysilane is improved while blockage in a reactor caused by attachment of higher-order silicon chloride as a by-product is prevented. Another object of the present invention is to provide a fluidized-bed reactor that is suitably used for producing the chloropolysilane.

Solution to Problem

To achieve the objects and in accordance with the purpose of the present invention, in the method according to a preferred embodiment of the present invention for producing chloropolysilane by reacting fluidized silicon particles or silicon alloy particles with a chlorine gas, an outlet filter is provided, upstream from a product outlet that releases a reaction product, above the area in which the silicon particles or silicon alloy particles are fluidized inside a reaction tank, the outlet filter preventing fine particles blown up by fluidization from flowing out of the reaction tank through the product outlet, and a temperature of the outlet filter is set in a range of 210 to 350° C.

In the method, it is preferable that the silicon particles or silicon alloy particles are fluidized by a vibro-fluidization method.

The outlet filter preferably has a pore diameter in a range of 5 to 500 μm.

It is preferable that a second filter that prevents fine particles that have passed through the outlet filter from flowing out to a receiver that reserves the reaction product is provided in addition to the outlet filter.

It is preferable that the outlet filter is made of one or more selected from the group consisting of sintered metal, sintered ceramic, and polytetrafluoroethylene, and the second filter is made of one or more selected from the group consisting of sintered metal, sintered ceramic, and polytetrafluoroethylene.

The outlet filter or the second filter after use may be reused by being subjected to alkali treatment.

In another aspect of the present invention, the fluidized-bed reactor according to a preferred embodiment of the present invention comprises a reaction tank in which raw material particles are fluidized, a product outlet that releases a reaction product from the reaction tank, an outlet filter that prevents fine particles blown up by fluidization from flowing out of the reaction tank through the product outlet, the outlet filter being disposed upstream from the product outlet, inside the reaction tank, and a temperature control unit that controls a temperature of the outlet filter.

It is preferable that the product outlet is disposed in an upper portion of the reaction tank.

It is preferable that the reactor further comprises, in addition to the outlet filter, a second filter that prevents the fine particles that have passed through the outlet filter from flowing out to a receiver that reserves the reaction product, the second filter being disposed inside or outside the reaction tank.

Advantageous Effects of Invention

According to the method for producing chloropolysilane according to the preferred embodiment of the present invention, the outlet filter disposed at the specific position inside the reaction tank prevents the silicon particles or the silicon alloy particles from flowing out through the product outlet, whereby the reaction yield is improved. In addition, other fine particles than these silicon raw material particles, the other fine particles being generated for example by chlorination reaction, are prevented from flowing out of the product outlet, whereby blockage in a tube and mixing of the fine particles as impurities into the reaction product are prevented. Further, since the temperature of the outlet filter is set in the range of 210 to 350° C., higher-order silicon chloride as a by-product is prevented from being attached to the filter to cause blockage in the filter.

When the outlet filter has a pore diameter in the range of 5 to 500 μm, the filter has an excellent effect of preventing the fine particles from flowing out of the product outlet.

When the above-described second filter is provided in addition to the outlet filter, the fine particles are prevented from flowing out to the receiver that reserves the reaction product even if a part of the fine particles has passed through the outlet filter. Thus, mixing of the fine particles as impurities into the reaction product is prevented.

Further, when the outlet filter or the second filter after use is reused by being subjected to the alkali treatment, costs of the filters are reduced while wasted filters are reduced, which makes the method for producing chloropolysilane environmentally friendly.

In the fluidized-bed reactor according to the preferred embodiment of the present invention, the outlet filter disposed at the specific position inside the reaction tank prevents the silicon particles or silicon alloy particles from flowing out of the product outlet, whereby the reaction yield is improved. In addition, other fine particles than these silicon raw material particles, the other fine particles being generated for example by chlorination reaction, are prevented from flowing out through the product outlet, whereby blockage in a tube and mixing of the fine particles as impurities into the reaction product are prevented. When the temperature of the outlet filter is set in the range of 210 to 350° C., higher-order silicon chloride as a by-product is prevented from being attached the filter to block the filter.

In addition, when the second filter that prevents the fine particles that have passed through the outlet filter from flowing out to the receiver that reserves the reaction product is provided in addition to the outlet filter inside or outside the reaction tank, the fine particles are prevented from flowing out to the receiver even if a part of the fine particles has passed through the outlet filter. Thus, mixing of the fine particles as impurities into the reaction product is prevented.

DESCRIPTION OF EMBODIMENTS

Hereinafter, a detailed description of preferred embodiments of the present invention will be provided.

A method for producing chloropolysilane according to the present invention is directed to producing disilicon hexachloride in a high yield by reacting fluidized silicon particles or silicon alloy particles (hereinafter, these are referred to also as a silicon raw material as a general term) with a chlorine gas. In chlorination reaction, the silicon raw material is reacted with the chlorine gas in a reaction tank. The reaction tank is not limited specifically as long as the reaction tank includes a temperature control mechanism and a fluidization mechanism to fluidize the silicon raw material put in the reaction tank. A jacket type, an internal heat exchanging type may be applied as the temperature control mechanism. A system for disposing the reaction tank in a chamber containing a heating medium having a controlled temperature may also be applied as the temperature control mechanism. The heating medium may be gas or may be liquid.

Examples of the fluidization mechanism include a mechanism that applies a force to the reaction tank from the outside and a mechanism that directly applies a force to the silicon raw material in the reaction tank. Examples of the mechanism that applies the force to the reaction tank from the outside include vibro-fluidization in which vibration is applied to the reaction tank to vibro-fluidize the silicon raw material in the reaction tank, and stirring-fluidization in which rotation is applied to the entire reaction tank to stir and fluidize the silicon raw material in the reaction tank. The stirring-fluidization may be performed using, for example, a rotary kiln or a conical dryer. Examples of the mechanism that directly applies the force to the silicon raw material in the reaction tank include a mechanism including a stirring blade in the reaction tank, and a mechanism to circulate a fluid such as gas or liquid in the reaction tank and to fluidize the silicon raw material in the reaction tank using the force of the circulation of the fluid. Examples of the stirring blade include a paddle stirring blade. These fluidization mechanisms may be used singly or in combination. A preferable fluidization mechanism is the vibro-fluidization. In the vibro-fluidization, no rotating seal is used as in the mechanism including the stirring blade. Thus, the gas in the reaction tank is prevented from leaking. In the vibro-fluidization mechanism, for example, a vibro-fluidized-bed reaction tank may be used.

Hereinafter, a detailed description of the vibro-fluidization is provided as an example of the fluidization mechanism; however, the present invention is not limited specifically to the vibro-fluidization.

Figure 1:
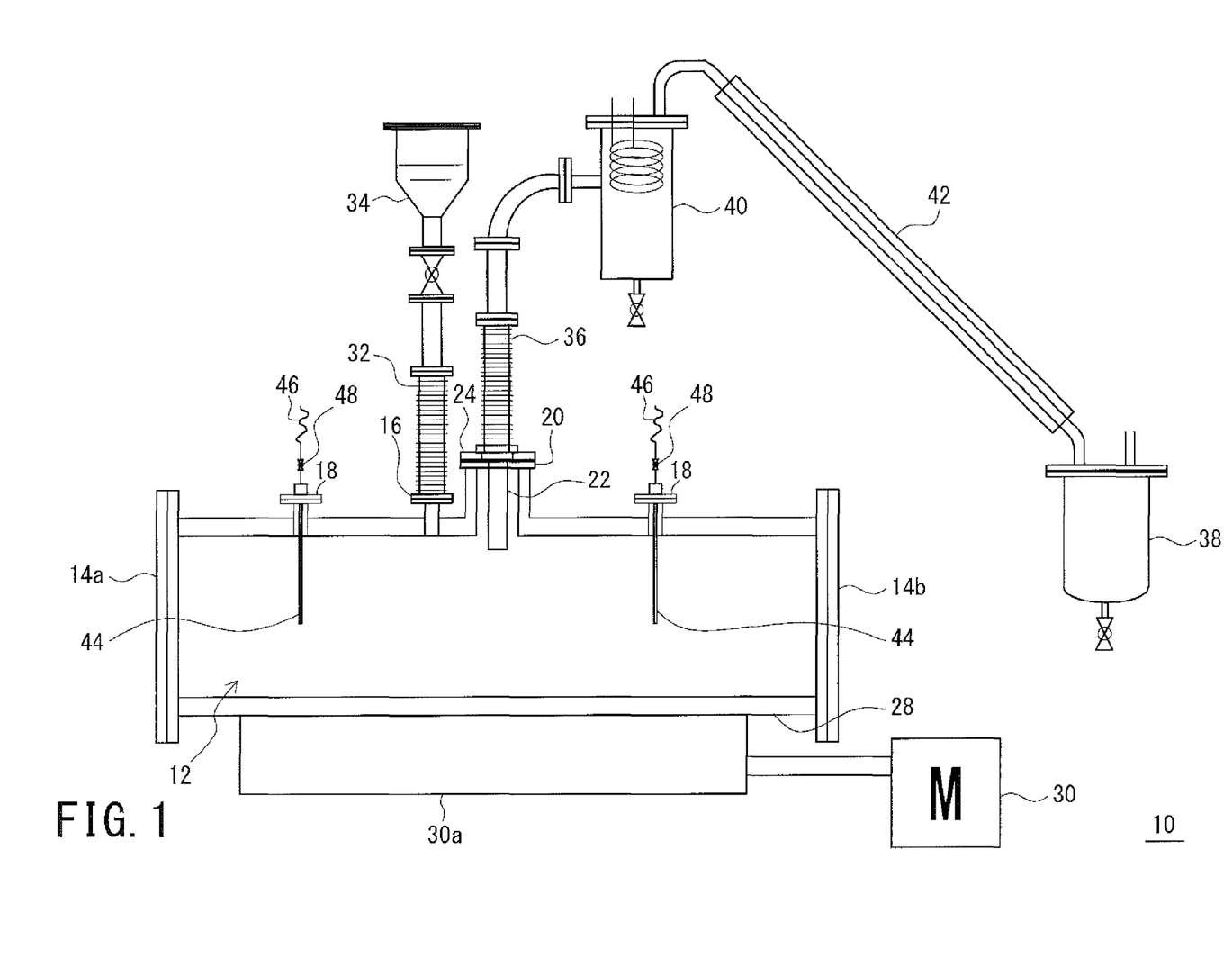
FIG. 1 is a schematic view of a vibro-fluidized-bed reactor according to one preferred embodiment of the present invention.
Figure 2:
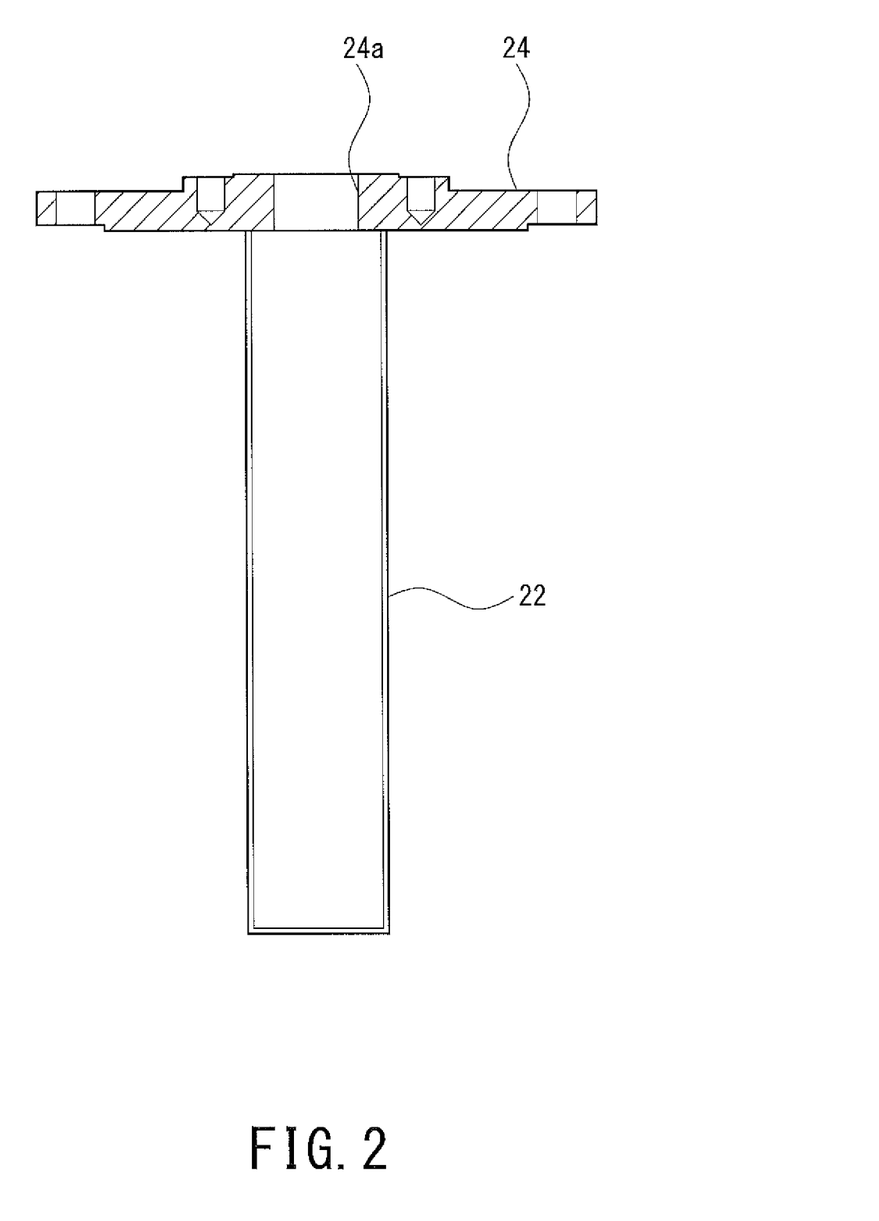
FIG. 2 is an expanded cross-sectional view of an outlet filter.
Figure 3:
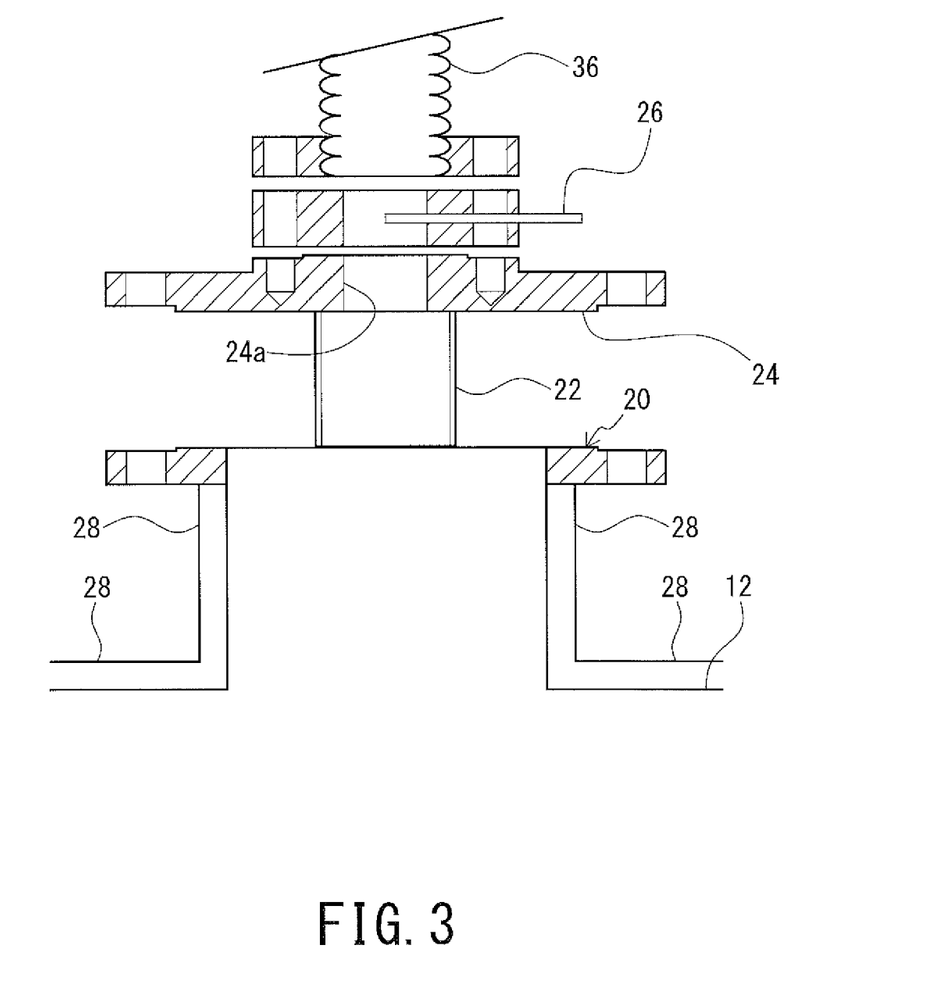
FIG. 3 is an expanded cross-sectional view of a portion where a thermometer that measures the temperature of the outlet filter is installed.
Figure 4:
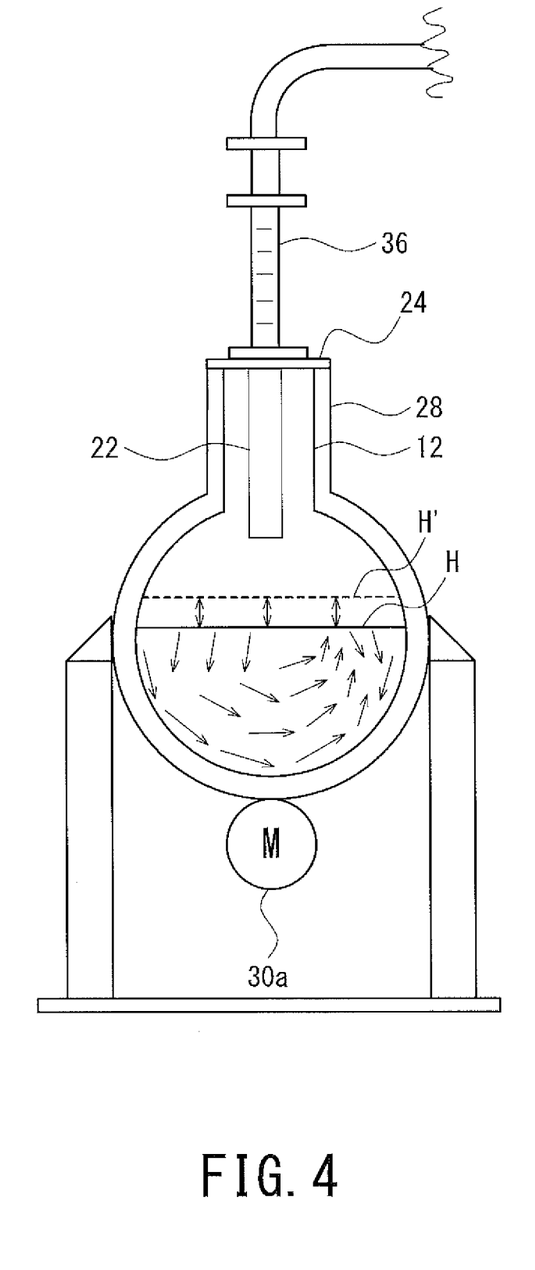
FIG. 4 is an expanded cross-sectional view of the portion of FIG. 1 where the outlet filter is installed.

FIG. 1 is a schematic view of a vibro-fluidized-bed reactor according to one preferred embodiment of the present invention that is preferably used in the method for producing chloropolysilane according to the present invention (hereinafter, referred to also as the present production method). FIG. 2 is an expanded cross-sectional view of an outlet filter. FIG. 3 is an expanded cross-sectional view of a portion where a thermometer that measures the temperature of the outlet filter is installed. FIG. 4 is an expanded cross-sectional view of the portion of FIG. 1 where the outlet filter is installed.

As shown in FIG. 1, a vibro-fluidized-bed reactor 10 according to one preferred embodiment of the present invention includes a reaction tank 12 having a horizontal cylindrical shape in which raw material particles such as a silicon raw material is to be put. Both ends in the axial direction of the reaction tank 12 are closed by flanges 14a and 14b. The reaction tank 12 has, in the upper portion thereof, particle supply port 16 to supply the raw material particles into the reaction tank 12, a gas supply port 18 to supply a raw material gas such as a chlorine gas into the reaction tank 12, and a product outlet 20 to release a reaction product in the form of gas from the reaction tank 12.

In the reaction tank 12, an outlet filter 22 is provided upstream from the product outlet 20. As shown in FIG. 2, the outlet filter 22 is mounted integrally on a flange 24 of the product outlet 20. The outlet filter 22 is aligned with a passage hole 24a of the flange 24. The passage hole 24a is disposed in a center portion of the flange 24, and passes the reaction product. The reaction product passes through the passage hole 24a via the outlet filter 22 to be released from the reaction tank 12.

A jacket 28 to circulate a heating medium that performs heating and cooling of the reaction tank 12 is provided outside the reaction tank 12. Steamer heating medium oil may be used as the heating medium. The temperature of the heating medium is controlled by a temperature control unit (not illustrated), whereby the reaction temperature is controlled. The jacket 28 covers also the circumference of the outlet filter 22, and the temperature of the outlet filter 22 is controlled together with the temperature of the reaction tank 12 by the temperature control unit. The temperature of the outlet filter 22 may be measured with the use of a thermocouple. As shown in FIG. 3, a sheath tube 26 to mount the thermocouple is provided in a flow passage for the reaction product. The sheath tube 26 is placed outside the outlet filter 22 in proximity to the outlet filter 22. Mounting the thermocouple into the sheath tube 26 allows the temperature of the outlet filter 22 to be measured.

An output 30a of an eccentric motor 30 is coupled to the bottom of the reaction tank 12, and the rotation of the eccentric motor 30 provides circular vibration to the reaction tank 12 in a circumferential direction. A particle supply unit 34 is connected to the particle supply port 16 via a flexible hose 32 to absorb the circular vibration of the reaction tank 12. The particle supply unit 34 may be used for depositing, before the reaction of the reaction, not only the silicon raw material but also a catalyst such as copper or a copper compound to be described later, and may be used also for adding these materials into the reaction tank 12 during the chlorination reaction. The addition of these materials allows the powder level in the reaction tank 12 to remain constant even when the amount of the powder is reduced by the chlorination reaction. In addition, a receiver 38 to reserve the reaction product is connected to the product outlet 20 via a flexible hose 36 to absorb the circular vibration of the reaction tank 12. A cooling unit 42 to condense the reaction product is provided in a line on the way up to the receiver 38 via an intermediate trap 40. A blowing tube 44 to blow a raw material gas such as a chlorine gas into a predetermined position in the reaction tank 12 is provided to the gas supply port 18. A distal end of the blowing tube 44 is disposed at a predetermined position in the reaction tank 12, and this distal end of the blowing tube 44 defines a blowoff port from which the raw material gas blows out. A base end of the blowing tube 44 is disposed outside the reaction tank 12, and is connected to a gas supply line 46. The flow rate of the raw material gas that is supplied into the reaction tank 12 is adjustable (and stoppable) by a flow rate adjust valve 48 of the gas supply line 46. The amount of the raw material gas may be adjusted by a flow meter.

Since a heat transmission area of the reaction tank 12 may be increased when the reaction tank 12 is long and thin, it is preferable that the reaction tank 12 is long and thin from the view point of increasing the heat transmission area; however, the reaction tank 12 that is too long and thin is not easy to be produced because of difficulty in welding inside the reaction tank 12, and the reaction tank 12 becomes heavier as it becomes longer and thinner, which increases power required by the eccentric motor 30. Thus, it is preferable to set a ratio L/D of a length L versus an inner diameter D of the reaction tank 12 in the range of 1 to 10. In addition, it is preferable to set the ratio L/D in the range of 2 to 5 from the viewpoint of the heat transmission area, ease of production, and the power required by the motor 30.

The vibration of the reaction tank 12 is caused by the circular motion of the reaction tank 12 by the eccentric motor 30. For example, as indicated by the arrows shown in FIG. 4, the raw material particles put in the reaction tank 12 are rotationally fluidized (i.e., vibro-fluidized) in the circumferential direction in the reaction tank 12 by this circular motion. Consequently, the level of the raw material particles (i.e. the position of an interface between the layer of the particles and the gas phase) rises and falls. The solid line H indicates the level of the particles in a static state. The broken line H' indicates the level of the particles in the vibro-fluidized state.

In the present production method, chloropolysilane is obtained by bringing the silicon raw material into contact with the chlorine gas to cause reaction between them while vibro-fluidizing the silicon raw material with the use of the vibro-fluidized-bed reactor shown in FIG. 1. In the present production method, a mixture of chlorosilane is obtained since the silicon raw material is reacted with the chlorine gas. The chlorosilane is represented by the following general formula.

$$Si_nCl_{2n+2} \tag{Formula 1}$$

where n is an integer of 1 or more.

Specific examples of the chlorosilane include $SiCl_4$, $Si_2Cl_6$, $Si_3Cl_8$, $Si_4Cl_{10}$, $Si_5Cl_{12}$, and $Si_6Cl_{14}$. Among them, chloropolysilane, which is represented by Formula 1 with n being an integer of 2 or more in Formula 1, is preferable. $Si_2Cl_6$, $Si_3Cl_8$, and $Si_4Cl_{10}$ are more preferable. Among them, $Si_2Cl_6$ is especially useful. It is preferable that 10% by mass or more of $Si_2Cl_6$ is contained in the entire chlorosilane product. It is more preferable that 20% by mass or more of $Si_2Cl_6$ is contained.

In the present production method, the outlet filter 22 is disposed, upstream of the product outlet 20 to release the reaction product, above the area where the silicon raw material is vibro-fluidized (the range up to H' in FIG. 4) inside the reaction tank 12. That is, the outlet filter 22 is disposed upstream from the product outlet 20 inside the reaction tank 12 in a position where the vibro-fluidized silicon raw material is not in direct contact with the outlet filter 22.

Fine powders (i.e., fine particles) of the silicon raw material are generated by the vibro-fluidization (such as by smash) of the silicon raw material in the reaction tank 12. Fine powders (i.e., fine particles) consisting of a chlorinated compound contained in the silicon raw material as impurities are also generated. These fine particles generated in the reaction tank 12, together with the reaction product, could flow out to the receiver 38 to reserve the reaction product via tubes. In addition, these fine particles could accumulate in the tubes on the way to flow out to the receiver 38. Consequently, the reaction yield could be reduced, purity of the reaction product could be decreased, or blockage in the tubes could be caused.

The outlet filter 22 prevents these fine particles from flowing out of the reaction tank 12, and return the blown up fine particles into the area where the silicon raw material is vibro-fluidized. In the present production method, the silicon raw material is fluidized by vibration. Thus, even if the fine particles are attached to the surface of the outlet filter 22, the attached fine particles fall down from the surface of the outlet filter 22 by the vibration, whereby the fine particles that have been blown up are returned into the area where the silicon raw material is vibro-fluidized. Consequently, the fine particles are prevented from accumulating on the surface of the outlet filter 22, so that blockage in the outlet filter 22 with the fine particles is prevented, and thus the outlet filter 22 resists extended periods of use.

In the present production method, higher-order silicon chloride such as $Si_3Cl_8$ can be produced as a by-product besides $Si_2Cl_6$ depending on reaction conditions. The higher-order silicon chloride has a higher boiling point than $Si_2Cl_6$. While the higher-order silicon chloride is produced in a form of gas at the reaction temperature, there is a possibility of condensation or precipitation of the higher-order silicon chloride by being cooled before released. To eliminate the possibility, the temperature of the outlet filter 22 is set in the range of 210 to 350° C. in the present production method. Consequently, blockage in the filter caused by attachment of the higher-order silicon chloride that can be produced as a by-product is prevented.

The boiling point of $Si_3Cl_8$, which may be produced as the by-product, is 216° C. During the reaction, because of currents of the supplied gas, the higher-order silicon chloride is prevented from being condensed or precipitated on the outlet filter 22 when the temperature of the outlet filter 22 is kept at 210° C. or higher. For this reason, the lower limit of the temperature of the outlet filter 22 is set at 210° C. On the other hand, the generated $Si_2Cl_6$ starts to be decomposed at the temperature of 350° C. or higher. For the reason of preventing the decomposition of the $Si_2Cl_6$, the upper limit of the temperature of the outlet filter 22 is set at 350° C.

The more preferable temperature of the outlet filter 22 is in the range of 220 to 250° C. When the temperature of the outlet filter 22 is 220° C. or higher, condensation of $Si_3Cl_8$ is prevented reliably. In addition, when the temperature of the outlet filter 22 is 250° C. or lower, thermal degradation of the outlet filter 22 is prevented.

The temperature of the outlet filter 22 may be controlled, for example, by control of the temperature of a heating medium in a jacket covering the circumference of the outlet filter 22. The jacket covering the circumference of the outlet filter 22 and the jacket 28 covering the circumference of the reaction tank 12 may be of a monolithic construction as in the vibro-fluidized-bed reactor 10 as shown in FIG. 1, and the temperature of the outlet filter 22 may be controlled so as to be same as the temperature of the reaction tank 12. Alternatively, the jacket covering the circumference of the outlet filter 22 and the jacket 28 covering the circumference of the reaction tank 12 may be of a separate construction, and the temperature of the outlet filter 22 may be controlled by a temperature control unit that is independent from the temperature control unit for the reaction tank 12.

It is preferable that the outlet filter 22 is resistant to a high-temperature environment because the outlet filter 22 is exposed to a high-temperature environment. Examples of the material of filter include sintered metal, sintered ceramic, and a high heat-resistance fluorine-containing resin. Examples of metal contained in the sintered metal include stainless steel (SUS304, SUS316, SUS316L, and the like), and other corrosion-resistant materials such as a corrosion-resistant alloy such as Hastelloy (trade name) and Inconel (trade name). Examples of the ceramic materials include silicon carbide, alumina, zirconia, and mullite. Examples of the fluorine-containing resin include polytetrafluoroethylene (PTFE). In addition, these materials may be combined by a coating or covering method. These materials may be used singly, or may be used in combination.

It is preferable that the outlet filter 22 has a pore diameter in the range of 5 to 500 µm. It is more preferable that the outlet filter 22 has a pore diameter in the range of 10 to 200 µm, and still more preferable that the outlet filter 22 has a pore diameter in the range of 20 to 100 µm. When the outlet filter 22 has a pore diameter of 5 µm or more, blockage in the outlet filter 22 with the generated fine particles is effectively prevented. On the other hand, when the outlet filter 22 has a pore diameter of 500 µm or less, the generated fine particles is effectively prevented from flowing out of the outlet filter 22.

If the outlet filter 22 is a membrane filter made of a resin film such as a fluorine-containing resin film, fine particle-trapping performance of the outlet filter 22 may be evaluated in terms of weight per unit area or air permeation rate, instead of a pore diameter. It is preferable that the membrane has a weight per unit area in the range of 100 to 500 g/cm$^2$. It is more preferable that the membrane filter has a weight per unit area in the range of 200 to 400 g/cm$^2$. It is preferable that the membrane filter has an air permeation rate in the range of 1.0 to 7.0 cm$^3$/cm$^2$/sec. It is more preferable that the membrane filter has an air permeation rate in the range of 2.0 to 5.0 cm$^3$/cm$^2$/sec.

In the present production method, the outlet filter 22 may be used alone to prevent the fine particles generated in the reaction tank 12 from flowing out, or two-stage filters comprising a second filter in addition to the outlet filter 22 may be used. The second filter prevents the fine particles that have passed through the outlet filter 22 from flowing out. Using the second filter enhances the effect of preventing the fine particles from flowing out. In addition, three or more-stage filters may be used to prevent the fine particles generated in the reaction tank 12 from flowing out. Using the three or more-stage filters further enhances the effect of preventing the fine particles from flowing out.

If the second filter is used, the second filter may be disposed inside the reaction tank 12, or may be disposed outside the reaction tank 12. If the second filter is disposed inside the reaction tank 12, the second filter prevents the fine particles that have passed through the outlet filter 22 from flowing out of the product outlet 20. If the second filter is disposed outside the reaction tank 12, the second filter prevents the fine particles that have passed through the outlet filter 22 from flowing out to the receiver 38 to reserve the reaction product even if the fine particles flow out of the product outlet 20.

Figure 5:
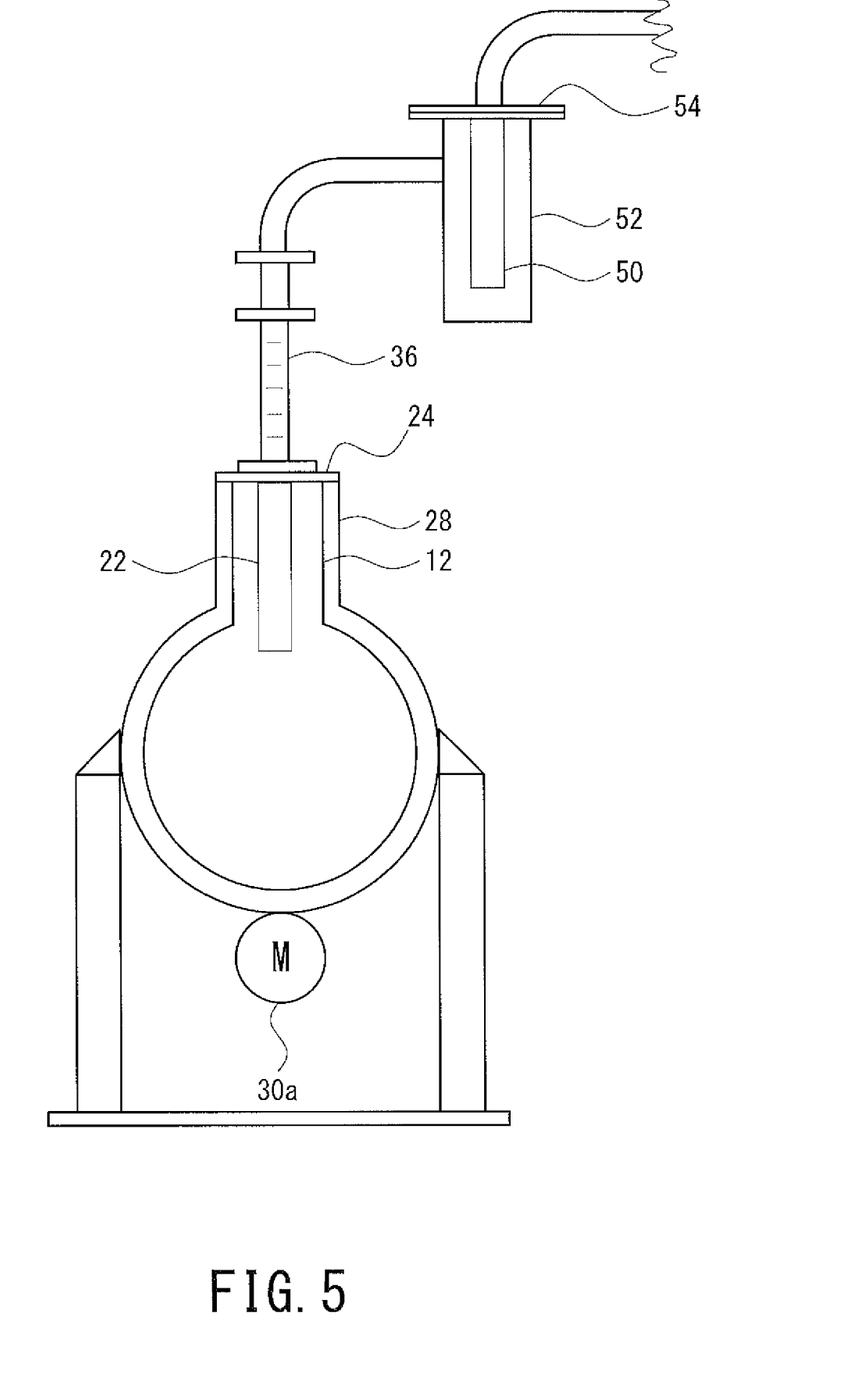
FIG. 5 is an expanded cross-sectional view of a portion of the vibro-fluidized-bed reactor where a second filter and the outlet filter are installed.

Shown in FIG. 5 is one example of a configuration where the second filter in addition to the outlet filter 22 is used, and the second filter is disposed outside the reaction tank 12. A second filter 50 is disposed at some midpoint in a tubes upstream from the cooling unit 42 that condenses the reaction product. The second filter is accommodated in a protective tube 52. The protective tube 52 has a cylindrical body of which one end surface is closed. The open end surface of the protective tube 52 is provided with a flange 54. The flange has, in the center portion thereof, a passage hole through which the reaction product passes. The second filter 50 is mounted integrally on the flange 54 while the second filter 50 is aligned with the passage hole. The reaction product that has been released from the reaction tank 12 passes through the passage hole via the second filter 50, and then is condensed in the cooling unit 42 that condenses the reaction product. The condensed reaction product is reserved in the receiver 38.

It is also preferable that the higher-order silicon chloride as the by-product is not condensed or precipitated on the second filter 50. From this viewpoint, it is preferable that controls the temperature of the second filter 50. Specifically, it is preferable to set the temperature of the second filter 50 in the range of 220 to 250° C. The temperature of the second filter 50 may be controlled with the use of a conventional temperature regulating device.

Examples of the material of the second filter 50 include sintered metal, sintered ceramic, and a high heat-resistance fluorine-containing resin. It is preferable that the second filter 50 has a pore diameter in the range of 5 to 500 μm. It is more preferable that the second filter 50 has a pore diameter in the range of 10 to 200 μm, and still more preferable that the second filter 50 has a pore diameter in the range of 20 to 100 μm. If the second filter 50 is a membrane filter, it is preferable that the membrane filter has a weight per unit area in the range of 100 to 500 g/cm². It is more preferable that the membrane filter has a weight per unit area in the range of 200 to 400 g/cm². In addition, it is preferable that the membrane filter has an air permeation rate in the range of 1.0 to 7.0 cm³/cm²/sec. It is more preferable that the membrane filter has an air permeation rate in the range of 2.0 to 5.0 cm³/cm²/sec.

When the second filter 50 is used in addition to the outlet filter 22, the second filter 50 and the outlet filter 22 may be used in combination, for example, such that coarse particles are prevented from flowing out by the outlet filter 22 and fine particles that are finer than the coarse particles are prevented from flowing out by the second filter 50. This configuration effectively prevent blockage on the surface of the outlet filter 22 with the fine particles.

Examples of the combination include a combination of a sintered metal filter (as the outlet filter 22) having a large pore diameter (e.g., 100 μm or more) and a sintered metal filter (as the second filter 50) having a small pore diameter (e.g., 20 μm or less), a combination of the sintered metal filter (as the outlet filter 22) having a large pore diameter and a PTFE filter (as the second filter 50), a combination of a sintered metal filter (as the outlet filter 22) having a small pore diameter and a PTFE filter (as the second filter 50), and a combination of a PTFE filter (as the outlet filter 22) having a large weight per unit area or a large air permeation rate and a PTFE filter (as the second filter 50) having a small weight per unit area or a small air permeation rate.

While being excellent in heat resistance (having a heat-resistant temperature of 500° C. or more) and excellent in physical strength, the sintered metal filter has a tendency to be blocked with the fine particles when the pore diameter is small (e.g., 50 μm or less). Meanwhile, while being slightly inferior in heat resistance (having a heat-resistant temperature of 260° C.) and slightly inferior in physical strength, the PTFE filter is excellent in fine particle-trapping performance and has a tendency not to be easily blocked with the fine particles. Hence, an especially preferable combination is the combination of a sintered metal filter (as the outlet filter 22) having a large pore diameter (e.g., 100 μm or more) and a PTFE filter (as the second filter 50).

In this combination, to prevent the coarse particles from flowing out the sintered metal filter having a large pore diameter and excellent in heat resistance is used as the outlet filter 22 inside the reaction tank 12 where the temperature is set relatively high while to prevent the fine particles from flowing out the PTFE filter that is excellent in fine particle-trapping performance is used as the second filter 50 outside the reaction tank 12 where the temperature is relatively lowered. Hence, while thermal degradation and blockage with the fine particles of the outlet filter 22 are prevented as well as condensation and precipitation of higher-order silicon chloride, the fine particle-trapping performance is improved.

The outlet filter 22 and the second filter 50 after use may be reused by being subjected to alkali treatment. Hence, costs of the filters is reduced while wasted filters are reduced, which makes the present production method environmentally friendly. Examples of the alkali used for the alkali treatment include an NaOH aqueous solution, a KOH aqueous solution, and tetramethylammonium hydroxide (TMAH). These alkalis may be used singly, or may be used in combination. Examples of especially suitable filter to be subjected to alkali treatment include a PTFE filter from the viewpoint of being excellent in chemical resistance.

Though the high-purity chlorine gas may be supplied as the raw material gas without being diluted, it is preferable to supply a mixed gas containing the chlorine gas and a diluent gas. The diluent gas lowers the concentration of the chlorine gas, so that the reaction of the chlorine gas with the silicon raw material becomes mild to prevent the temperature rise due to heat of reaction. In addition, the heat of reaction is taken by the diluent gas from the space where the diluent gas has been blown into, so that heat removal effect of the diluent gas is expected.

It is preferable that the diluent gas is a gas that is poor in reactivity (non-reactive) with the silicon raw material. Examples of this kind of gas include an inert gas such as nitrogen and argon, and a by-product gas such as silicon tetrachloride. Among these gases, nitrogen is preferably used since nitrogen is inexpensive and easy to be handled.

When the diluent gas is used, it is preferable that the concentration of the chlorine gas is 90% by mass or less from the viewpoint of the effect of using the diluent gas. It is more preferable that the concentration of the chlorine gas is 80% by mass or less, and still more preferable that the concentration of the chlorine gas is 70% by mass or less. Meanwhile, it is preferable that the concentration of the chlorine gas is 0.1% by mass or more from the viewpoint of ensuring the reactivity with the silicon raw material. It is more preferable that the concentration of the chlorine gas is 10% by mass or more, and still more preferable that the concentration of the chlorine gas is 40% by mass or more.

In addition, in the preferred embodiment of the present invention, if moisture is contained in the diluent gas or the chlorine gas, the generated chloropolysilane may be subjected to hydrolysis, and thus the reaction yield may be decreased. Thus, it is preferable that the amount of the moisture contained is small. Regarding the diluent gas, a preferable moisture amount is 10000 ppm by volume or less, a more preferable moisture amount is 5000 ppm by volume or less, and still a more preferable moisture amount is 1500 ppm by volume or less. Regarding the chlorine gas, a preferable moisture amount is 5000 ppm by volume or less, a more preferable moisture amount is 1000 ppm by volume or less, and still a more preferable moisture amount is 500 ppm by volume or less. While the lower limit is not specifically determined, a preferable moisture amount is 0.01 ppm by volume or more, and a more preferable moisture amount is 0.1 ppm by volume or more for both of the diluent gas or the chlorine gas from the viewpoints of costs for removing the moisture to purify the gases, and keeping hermeticity of the facility.

The silicon raw material may be particles of a silicon alloy such as iron silicide, calcium silicide, and magnesium silicide. However, when the silicon alloy particles are used, metallic chlorides such as iron chloride, calcium chloride, and magnesium chloride are produced as a by-product besides the chlorosilane in a chlorination step, whereby the purity of the chlorosilane may be lowered. Thus, it is preferable to use silicon particles instead of the silicon alloy particles.

Low-purity silicon particles which contain a relatively large amount of impurities such as Fe, Ca, Mg, Al, Ti, C, and O may be used. However, relatively high-purity silicon particles are preferably used from the viewpoint that the load on separation of a by-product generated in the chlorination step is small. To be specific, it is preferable that a silicon purity of the silicon particles is, for example, 95% by mass or more. It is more preferable that the silicon purity of the silicon particles is 97% by mass or more. Absorbed moisture is not regarded as the impurity in the silicon particles. Moisture-absorbing property of the silicon particles is not very high, and absorbed moisture in industrially produced silicon particles is 3000 ppm by mass or less. The silicon particles may be used with containing the absorbed moisture, or may be also used after dried in an appropriate way. Examples of high-purity silicon raw material include a silicon wafer, polycrystalline silicon and amorphous silicon, and metallic silicon.

Regarding the impurity concentration in the silicon particles, it is preferable that the metallic elements other than silicon is 2% by mass or less with respect to the total mass of the silicon particles from the viewpoint of suppressing the load on separation of a by-product generated in the chlorination step. It is more preferable that the metallic elements other than silicon is 1% by mass or less, and still more preferable that the metallic elements other than silicon is 0.5% by mass or less. Since chlorides of Al and Ti are especially hard to be separated from chlorosilane among the metallic elements, it is desirable that concentrations of Al and Ti are low in the silicon particles. To be specific, it is preferable that elemental content of Al is 0.5% by mass or less, and elemental content of Ti is 0.1% by mass or less with respect to the total mass of the silicon particles. It is more preferable that the Al content is 0.3% by mass or less and the Ti content is 0.05% by mass or less, and still more preferable that the Al content is 0.2% by mass or less and the Ti content is 0.01% by mass or less. Regarding the metallic elements other than Al and Ti, it is preferable that Fe content is 0.2% by mass or less and Ca content 0.5% by mass or less with respect to the total mass of the silicon particles. It is more preferable that the Fe content is 0.1% by mass or less, and the Ca content is 0.04% by mass or less. Non-metallic elements such as carbon and oxygen can be contained in the metallic silicon as impuritie. Separation of by-products derived from these non-metallic elements from chlorosilane is relatively easily conducted by a purification method such as distillation. Thus concentrations of these non-metallic elements are not limited specifically.

Meanwhile, regarding the lower limit of the impurity concentration in the silicon raw material, since an eleven-nine grade silicon wafer is known, a silicon raw material which has an impurity concentration of 0.01 ppb by mass or more may be used. In addition, a silicon raw material which has an impurity concentration of 1 ppb by mass or more may be used preferably from the viewpoint of being easily available industrially at a low cost.

It is preferable that the silicon raw material has a relatively small particle size and a large surface area from the viewpoint that an activated catalyst to be described later is effectively prepared and that reaction of chlorination proceeds effectively. Meanwhile, if having a small particle size, the silicon raw material is easily blown up to flow out through the product outlet 20 during the vibro-fluidization, or tends to block the outlet filter 22 in the product outlet 20. From this point of view, it is preferable that the silicon raw material has a relatively large particle size. Thus, considering the balance, it is preferable that the silicon raw material has a particle size in the range of 1 μm to 5 mm. It is more preferable that the silicon raw material has a particle size in the range of 100 μm to 3 mm. The particle size of the silicon raw material may be measured, for example, by a laser diffraction particle size distribution analyzer. In the measurement, the particle size distribution may be analyzed on a volume basis, and the median diameter obtained may be used as a representative value of the particle size.

It is preferable to use a catalyst in the chlorination reaction of the silicon raw material from the viewpoint of promotion of the reaction. Examples of the catalyst include copper and a copper compound. Specific examples thereof include metallic copper, copper halide, copper sulfate, copper nitrate, copper carbonate, basic copper carbonate, and organic acid copper. These catalysts may be used singly, or may be used in combination. The oxidation number of the copper compound is not limited specifically, and the compound may be monovalent or may be divalent. Among these catalysts, the metallic copper and the copper chloride are more preferable, and the metallic copper is still more preferable.

It is preferable that the above-described catalyst has granular shapes. It is preferable that the catalyst has a relatively small particle size and a large surface area from the viewpoint that an activated catalyst to be described later is effectively prepared. Meanwhile, if having a small particle size, the catalyst tends to be aggregated. From this point of view, it is preferable that the catalyst has a relatively large particle size. Thus, considering the balance, it is preferable that the catalyst has a particle size in the range of 1 μm to 0.2 mm. It is more preferable that the catalyst has a particle size in the range of 10 μm to 0.1 mm. Concerning the particle size of the catalyst, the median diameter may be used as a representative value of the particle size similarly to the case of the silicon raw material.

Among the above-described catalysts, metallic copper powder produced in a variety of production method such as wet reduction and atomizing may be used suitably. Stamped copper powder having a crushed flat shape may also be used suitably. In addition, arborescent copper powder called electrolytic copper powder may also be used suitably for activation by a reaction with the silicon raw material.

When the above-described catalyst is brought into contact with and reacted with the silicon raw material at a predetermined temperature, an activated catalyst that promotes the chlorination reaction of the silicon raw material is prepared. The temperature for preparation the activated catalyst is preferably 250° C. or higher, and more preferably 280° C. or higher. Meanwhile, the upper limit of the temperature is not limited specifically; however, since a cost of a device capable of withstanding a high temperature is high in the field of industry, the preferable upper limit is 400° C., and the more preferable upper limit is 350° C. or lower. The heating time for preparing the activated catalyst is not limited specifically; however, a preferable heating time is in the range of 10 minutes to 24 hours, and a more preferable heating time is in the range of 1 hour to 12 hours.

It is preferable that the reaction for preparing the activated catalyst is conducted in an atmosphere of an inert gas such as nitrogen gas and an argon gas, in a reducing atmosphere such as in hydrogen gas, or in a chlorine gas atmosphere from the viewpoint of suppressing generation of a silicon oxide and a copper oxide and thus suppressing deterioration of the activity of catalyst. It is preferable that the reaction for preparing the activated catalyst is conducted while the catalyst and the silicon raw material are being fluidized. Conventional techniques such as a vibro-fluidizing method, a gas phase-fluidizing method, and a paddle method may be applied to the fluidization. The vibro-fluidized-bed method is more preferable since the catalyst and the silicon raw material are particles having high (densities, and since the amount of airflow in the chlorination reaction is small.

Generation of the activated catalyst may confirmed, for example, by checking that the reaction rate is increased when the chlorination reaction of the silicon raw material is conducted. Generation of the activated catalyst may also be confirmed, for example, by extracting an unreacted catalyst and checking that a copper component is left in the silicon raw material after the reaction for preparing the activated catalyst is conducted. When the catalyst is made of metallic copper, the activated catalyst is not dissolved in nitric acid while the metallic copper is dissolved in nitric acid, so that unreacted metallic copper may be extracted with nitric acid. It is preferable that the concentration of the activated catalyst is 2 ppm by mass or more and 10% by mass or less with respect to the total amount of the silicon raw material and the activated catalyst. It is more preferable that the concentration of the activated catalyst is 5 ppm by mass or more and 5% by mass or less.

The chlorination reaction of the silicon raw material may be conducted by starting to supply a chlorine gas after the preparation of the activated catalyst or concurrently with the preparation of the activated catalyst. It is preferable that the chlorination reaction of the silicon raw material is conducted at a temperature in the range of 150 to 300° C. from the viewpoint of excellent selectivity of disilicon hexachloride among the chlorosilane. It is more preferable that the chlorination reaction of the silicon raw material is conducted at a temperature in the range of 170 to 270° C., and still more preferable that the chlorination reaction of the silicon raw material is conducted at a temperature in the range of 200 to 250° C.

The reaction temperature during the chlorination reaction may be controlled via the temperature of the heating medium. For example, in the early stage of the reaction, it is preferable to heat the heating medium to raise the reaction temperature to a predetermined value. When the chlorination reaction proceeds, it is preferable to heat or cool the heating medium to keep the reaction temperature at the predetermined value while considering the temperature rise due to the heat of reaction. The chlorination reaction may be conducted under normal pressure, under increased pressure, or under reduced pressure. The reactivity in the chlorination reaction is improved under increased pressure.

In the chlorination reaction of the silicon raw material, the chlorine gas may be supplied continuously, or may be supplied intermittently. The chlorine gas may be supplied into one position, or may be supplied dispersively into a plurality of positions. In addition, the silicon raw material may be supplied by a predetermined amount at the beginning so as not to be additionally supplied until the end of the reaction, or may be supplied successively in midstream to conduct the chlorination reaction continuously.

In the vibro-fluidized-bed reactor 10 used for the chlorination reaction, components such as the reaction tank 12 and the blowing tube 44 may be made of SUS304, SUS316, or the like. It is preferable that components such as the blowing tube 44 that is in permanent contact with the chlorine gas is made of a material resistant to corrosion due to the chlorine gas for a portion. Examples of the corrosion-resistant material include metallic materials and ceramic materials. Examples of the metallic materials include corrosion-resistant alloys such as Hastelloy (trade name) and Inconel (trade name) while examples of the ceramic material include silicon carbide, alumina, zirconia, mullite, and quartz glass. The ceramic materials are more preferable because the ceramics are excellent in corrosion resistance and heat resistance, and the silicon carbide is especially preferable among them because the silicon carbide is excellent also in wear resistance.

It is preferable that the blowing tube 46 has an inner diameter of 1 mm or more from the viewpoint that the blowing tube 46 is not easily blocked with the silicon raw material, and has an inner diameter of 30 mm or less from the viewpoint of preventing entrance of powders. A more preferable inner diameter of the blowing tube 46 is in the range of 2 to 10 mm. In addition, it is preferable that the blowing tube 46 has a wall thickness of 1 mm or more from the viewpoint of being excellent in corrosion resistance.

EXAMPLE

A more detailed description of the present invention is provided below with reference to Examples; however the present invention is not limited thereto.

<Configuration of Vibro-Fluidized-Bed Reactor>

A vibro-fluidized-bed reactor having the configuration shown in FIG. 4 was prepared. A reaction tank having a horizontal cylindrical shape (25 L, 250 mm in inner diameter×600 mm in length) was used. The reaction tank is capable of circularly vibrating in the circumferential direction. The circular vibration of the reaction tank vibro-fluidizes a silicon raw material. The reaction temperature is controlled by a heating medium circulating in a jacket. The silicon raw material is supplied from a particle supply port, and a chlorine gas is supplied from a blowing tube. Chlorosilane including chloropolysilane is released as a reaction product through a product outlet. The reaction product is condensed in a cooling unit and is reserved in a receiver. An outlet filter was disposed upstream from the product outlet in the upper portion of the reaction tank.

<PTFE Filter>

The outlet filter shown in FIG. 4 was prepared by placing a filter bag made of PTFE over a frame welded to a flange of the product outlet, fixing both of the upper and lower ends of the bag with a wire. A "Gore filter bag HD series PTFE, woven cloth" manufactured by W. L. GORE & ASSOCIATES, INC. was used as the PTFE filter. The specifications of the PTFE filter are as follows:

Weight per unit area: 300 g/cm²
Thickness: 0.25 mm
Air permeation rate: 4.0 cm³/cm²/sec
Normal operating temperature: 260° C.
<Sintered Metal Filter>

The outlet filter shown in FIG. 4 was prepared by directly welding a sintered metal element to a flange of the product outlet. The specifications of the sintered metal filter are as follows:
Material: SUS316L
Density of sintered material: 4.2 to 5.2 g/cm³
Porosity: 36 to 48%
Operating temperature: −250 to 550° C.
Pore diameter: 20 μm or 100 μm
<Chlorination Reaction>

Chlorination reaction was conducted by putting a silicon raw material and a chlorination catalyst in the reaction tank, vibrating the reaction tank, and supplying a raw material gas while heating the reaction tank to a predetermined temperature. The reaction conditions are listed below. In advance of the chlorination reaction, an activated catalyst was prepared. For the preparation of the activated catalyst, before chlorine gas was blown, nitrogen gas was supplied into the reaction tank at a rate of 1 L/h via a blowing tube, and the reaction tank was heated for three hours with the temperature of the heating medium kept at 320° C. During the supply of the nitrogen gas and the heating, the reaction tank was vibrated at 1500 cps with an amplitude of 3 mm.
Silicon raw material: 24 kg of silicon particles (manuf. ELKEM JAPAN, "Silgrain HQ" ("Silgrain" is a registered trademark of ELKEM JAPAN), with a Si purity of 99.7% by mass and a median particle size of 520 μm)
Chlorination catalyst: 1 kg of electrolytic copper powder
Reaction temperature (heating medium temperature): 250° C.
Raw material gas: 50 vol % of chlorine gas+50 vol % of nitrogen gas
Supply rate of chlorine gas: 250 L/h
Supply rate of nitrogen gas: 250 L/h
Number of blowing tubes: one tube
Vibration condition: frequency of 1500 cpm, and amplitude of 3 mm Example 1

Figure 6:
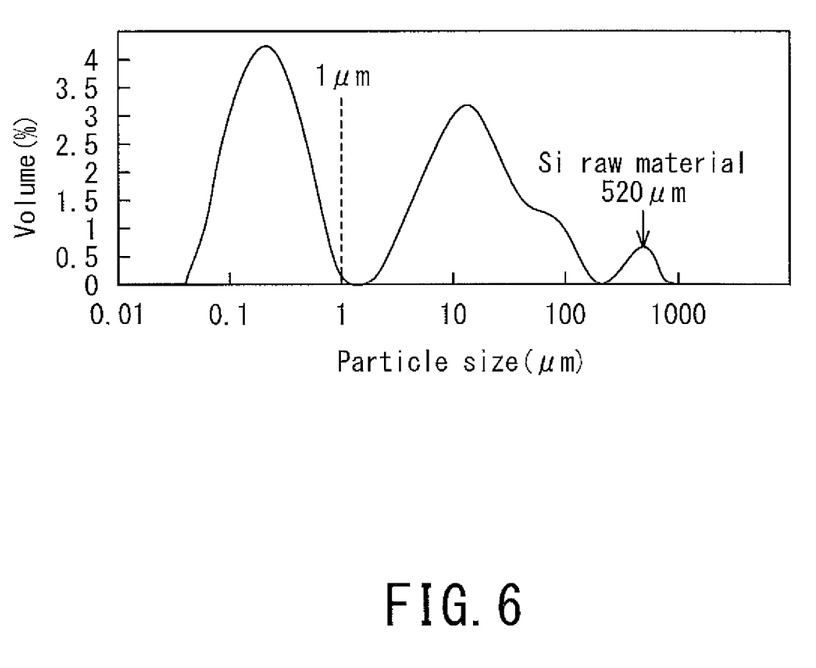
FIG. 6 is a chart showing size distribution of fine particles trapped in Example 1.

Chlorination reaction was conducted with the use of the PTFE filter as an outlet filter. The size distribution of fine particles attached to the surface of the PTFE filter was measured after completion of the reaction. The size distribution of the trapped fine particles has three peaks as shown in FIG. 6: a first peak is in the range of 0.03 to 1 μm with centered at 0.2 μm, the second peak is in the range of 1 to 100 μm with centered at 10 μm, and the third peaks is in the range of 100 to 1000 μm with centered at the 500 μm. Since the median particle size of the silicon raw material is 520 μm, it is assumed that the fine particles having a size of 1 μm or smaller was contained originally in the raw material, or was generated during the reaction. Meanwhile, it is assumed that the fine particles having a size around 10 μm was generated by aggregation of the fine particles having a size of 1 μm or small. These results indicate that the PTFE filter trapped fine particles having a size of 1 μm or smaller, and was very excellent in trapping performance.

In addition, while the PTFE filter was continuously used for 100 hours, no rise in differential pressure was seen. This is presumably because the PTFE filter vibrated due to the vibration of the reaction tank or due to the product gas, whereby a part of the fine powders attached to the filter fell down and returned to the inside of the reaction tank. This result indicates that the PTFE filter may be used for a long time without blockage.

Example 2

Chlorination reaction was conducted with the use of the sintered metal filter (pore size: 20 μm) as an outlet filter. The differential pressure between the back and front surfaces of the filter rose up to 0.07 MPa in four hours of the reaction. In addition, when the surface of the sintered metal filter was observed after the completion of the reaction, accumulation of the fine particles was found on the surface of the filter with a thickness of several millimeters. Thus, the filter showed a slight tendency to be blocked.

Example 3

Chlorination reaction was conducted with the use of the sintered metal filter (pore size: 100 μm) as an outlet filter. No rise of differential pressure between the back and front surfaces of the filter was observed even after four hours of the reaction. In addition, when the surface of the sintered metal filter was observed after the completion of the reaction, no accumulation of the fine particles was found on the surface of the filter. Meanwhile, the sintered metal filter showed a tendency of allowing passage of fine particles having a particle size of 1 μm or less.

In Examples 1 to 3, blockage caused by attachment of higher-order silicon chloride was not observed on the surfaces of the outlet filters. In addition, it was found that using only the outlet filters prevents the particles from flowing out to some extent. Therefore, it was confirmed that according to the present invention, reaction yields is improved while blockage caused by attachment of higher-order silicon chloride that can be produced as a by-product is prevented in obtaining chloropolysilane by vibro-fluid reaction.

These results indicate that only the outlet filter may be used to prevent the particles from flowing out. However, using two-stage filters as follows may enhance the effect of preventing the fine particles from flowing out. That is, the sintered metal filter, which has a large pore diameter and is excellent in heat resistance, may be used as the outlet filter placed inside the tank where the temperature is set relatively high to prevent coarse particles from flowing out while the PTFE filter, which is excellent in fine particle-trapping performance, may be used as a second filter placed outside the reaction tank where the temperature is relatively low to prevent fine particles from flowing out.

The foregoing description of the preferred embodiments of the present invention has been presented for purposes of illustration and description with reference to the drawings. However, it is not intended to limit the present invention to the embodiments, and modifications and variations are possible as long as they do not deviate from the principles of the present invention.

For example, while shown as a preferable example in the above-described embodiments is using the reaction tank 12 having a horizontal cylindrical shape because the reaction tank 12 having a horizontal cylindrical shape makes the movement due to vibration of the raw material particles such as a silicon raw material more strenuous than a reaction tank having a vertical cylindrical shape, chlorination reaction may be conducted by using a reaction tank having a vertical cylindrical shape in the present invention. In addition, while shown in the above-described embodiments is the configuration that both the ends in the axial direction of the reaction tank 12 are closed by the flanges 14a and 14b, the reaction tank 12 may have a configuration that at least one end in the axial direction of the reaction tank 12 is openable and closable with a flange from the viewpoint of ensuring ease of maintenance of the reaction tank 12. In addition, while shown as a preferable example in the above-described embodiments is the jacket type heating method using the jacket 28 to heat the reaction tank from the viewpoint of excellent heat transfer efficiency, the reaction tank may be a heated by an electric heater instead of the jacket. In addition, while shown in the above-described embodiments is the configuration that the output 30a of the eccentric motor 30 is coupled to the bottom of the reaction tank 12, an eccentric motor may be directly mounted on the bottom of the reaction tank 12 such that the reaction tank 12 vibrates together with the eccentric motor.

INDUSTRIAL APPLICABILITY

The method for producing chloropolysilane according to the present invention may be used for production of $Si_2Cl_6$ (disilicon hexachloride) that is a raw material of $Si_2H_6$ (disilane) used preferably as a silicon source for silicon semiconductor devices.

The invention claimed is:

1. A method for producing chloropolysilane by reacting fluidized silicon particles or silicon alloy particles with a chlorine gas,
    wherein an outlet filter is provided, upstream from a product outlet that releases a reaction product, above the area in which the silicon particles or silicon alloy particles are fluidized inside a reaction tank, the outlet filter preventing fine particles blown up by being fluidized from flowing out of the reaction tank through the product outlet, and a temperature of the outlet filter is set in a range of 210 to 350° C.

2. The method for producing chloropolysilane according to claim 1,
    wherein the silicon particles or silicon alloy particles are fluidized by a vibro-fluidization method.

3. The method according to claim 2, wherein the outlet filter has a pore diameter in a range of 5 to 500 μm.

4. The method for producing chloropolysilane according to claim 3,
    wherein a second filter that prevents fine particles that have passed through the outlet filter from flowing out to a receiver that reserves the reaction product is provided in addition to the outlet filter.

5. The method for producing chloropolysilane according to claim 4,
    wherein the outlet filter is made of one or more selected from the group consisting of sintered metal, sintered ceramic, and polytetrafluoroethylene, and
    the second filter is made of one or more selected from the group consisting of sintered metal, sintered ceramic, and polytetrafluoroethylene.

6. The method for producing chloropolysilane according to claim 5,
    wherein the outlet filter or the second filter after use is reused by being subjected to alkali treatment.

7. The method according to claim 1, wherein the outlet filter has a pore diameter in a range of 5 to 500 μm.

8. The method for producing chloropolysilane according to claim 1,
    wherein a second filter that prevents fine particles that have passed through the outlet filter from flowing out to a receiver that reserves the reaction product is provided in addition to the outlet filter.

9. The method for producing chloropolysilane according to claim 8,
    wherein the outlet filter is made of one or more selected from the group consisting of sintered metal, sintered ceramic, and polytetrafluoroethylene, and
    the second filter is made of one or more selected from the group consisting of sintered metal, sintered ceramic, and polytetrafluoroethylene.

10. The method for producing chloropolysilane according to claim 8,
    wherein the outlet filter or the second filter after use is reused by being subjected to alkali treatment.

11. The method for producing chloropolysilane according to claim 1,
    wherein the outlet filter is made of one or more selected from the group consisting of sintered metal, sintered ceramic, and polytetrafluoroethylene.

12. The method for producing chloropolysilane according to claim 1,
    wherein the outlet filter after use is reused by being subjected to alkali treatment.

* * * * *